(12) United States Patent
Kikuchi et al.

(10) Patent No.: US 7,869,939 B2
(45) Date of Patent: Jan. 11, 2011

(54) ROUTE GUIDE DATA CREATION DEVICE, ROUTE GUIDE DATA CREATION METHOD, AND ROUTE GUIDE DISTRIBUTION DEVICE

(75) Inventors: Shin Kikuchi, Tokyo (JP); Keisuke Onishi, Tokyo (JP)

(73) Assignee: Navitime Japan Co., Ltd., Tokyo (JP)

( * ) Notice: Subject to any disclaimer, the term of this patent is extended or adjusted under 35 U.S.C. 154(b) by 825 days.

(21) Appl. No.: 10/581,529

(22) PCT Filed: Nov. 19, 2004

(86) PCT No.: PCT/JP2004/017259

§ 371 (c)(1),
(2), (4) Date: Jun. 2, 2006

(87) PCT Pub. No.: WO2005/055170

PCT Pub. Date: Jun. 16, 2005

(65) Prior Publication Data

US 2007/0112509 A1    May 17, 2007

(30) Foreign Application Priority Data

Dec. 4, 2003    (JP) .............................. 2003-405771

(51) Int. Cl.
G08G 1/127 (2006.01)
G01C 21/00 (2006.01)
(52) U.S. Cl. .................. 701/201; 701/117; 340/994
(58) Field of Classification Search ............... None
See application file for complete search history.

(56) References Cited

U.S. PATENT DOCUMENTS

| 6,629,034 | B1 * | 9/2003 | Kozak et al. ............... 701/200 |
| 2002/0069017 | A1 * | 6/2002 | Schmier et al. ............ 701/213 |
| 2005/0131634 | A1 * | 6/2005 | Ignatin ...................... 701/202 |

FOREIGN PATENT DOCUMENTS

| JP | 8-305996 A | 11/1996 |
| JP | 2000-311296 A | 11/2000 |
| JP | 2001-503541 A | 3/2001 |
| JP | 2001-307296 A | 11/2001 |

(Continued)

OTHER PUBLICATIONS

International Search Report mailed Mar. 1, 2005 of International Application PCT/JP2004/017259.

*Primary Examiner*—Michael J. Zanelli
(74) *Attorney, Agent, or Firm*—Westerman, Hattori, Daniels & Adrian, LLP

(57) ABSTRACT

A route guide data creation device for acquiring travel data transmitted from a vehicle traveling on a road according to a predetermined travel route and travel time and creating route guide data according to the data. The route guide data creation device acquires the travel data over a predetermined period of time. A travel data processor receives data based on a predetermined input format from the travel data and calculates the arrival time and departure time at/from each stop for each travel routes and for each vehicle ID. A route guide database stores the route guide data including the departure time and the arrival time of each vehicle from/at each stop outputted from the travel data processor.

13 Claims, 9 Drawing Sheets

FOREIGN PATENT DOCUMENTS

| | | |
|---|---|---|
| JP | 2001-338395 A | 12/2001 |
| JP | 2002-117487 A | 4/2002 |
| JP | 2002-310718 A | 10/2002 |
| JP | 2003-178395 | 6/2003 |
| JP | 2003-228798 A | 8/2003 |

* cited by examiner

FIG. 3

| Vehicle ID | Route code | The number of bus stops from the first bus stop | Next bus stop code | Arrival time at the previous bus stop | Departure time from the previous bus stop |
|---|---|---|---|---|---|
| 1001 | 301 | 1 | 30102 | 8:25:15 | 8:30:25 |
| 51 | 101 | 7 | 10108 | 8:30:20 | 8:30:30 |
| 2201 | 331 | 2 | 33003 | 8:30:20 | 8:30:31 |
| | | | | | |
| | | | | | |
| | | | | | |
| | | | | | |
| | | | | | |
| 2201 | 331 | 3 | 33004 | 8:32:30 | 8:32:30 |
| 1001 | 301 | 2 | 30103 | 8:37:00 | 8:37:10 |
| | | | | | |
| | | | | | |
| | | | | | |
| | | | | | |
| 2201 | 331 | 4 | 33005 | 8:34:30 | 8:34:30 |
| 51 | 101 | 8 | 10109 | 8:38:55 | 8:38:55 |
| | | | | | |
| 1001 | 301 | 3 | 30104 | 8:39:00 | 8:39:00 |

FIG. 4

| Vehicle ID | Route code | The number of bus stops from the first bus stop | Next bus stop code | Arrival time at the previous bus stop | Departure time from the previous bus stop |
|---|---|---|---|---|---|
| 1001 | 301 | 1 | 30102 | 8:25:15 | 8:30:25 |
| 1001 | 301 | 2 | 30103 | 8:37:00 | 8:37:10 |
| 1001 | 301 | 3 | 30104 | 8:39:00 | 8:39:00 |
| 1001 | 301 | 4 | 30105 | 8:40:50 | 8:40:59 |
| 1001 | 301 | 21 | 99999 | 9:29:00 | 9:34:15 |
| 1001 | 302 | 1 | 30221 | 9:29:00 | 9:34:15 |
| 2201 | 331 | 3 | 33004 | 8:32:30 | 8:32:30 |
| 2201 | 331 | 4 | 33005 | 8:34:30 | 8:34:30 |
| 2201 | 331 | 5 | 33007 | 8:35:15 | 8:35:25 |
| 2201 | 331 | 6 | 33007 | 8:36:35 | 8:36:35 |
| 2201 | 331 | 7 | 33008 | 8:37:50 | 8:38:05 |
| 2201 | 331 | 8 | 33009 | 8:39:50 | 8:40:05 |

(a)

| ① Vehicle ID | ② Route code | ③ Departing bus stop code | ④ Departing time | ⑤ Arriving bus stop code | ⑥ Arriving time |
|---|---|---|---|---|---|
| 1001 | 301 | 30101 | 8:30:25 | 30102 | 8:37:00 |
| 1001 | 301 | 30102 | 8:37:10 | 30103 | 8:39:00 |
| 2201 | 331 | 33004 | 8:34:30 | 33005 | 8:35:15 |
| 2201 | 331 | 33005 | 8:35:25 | 33007 | 8:37:50 |
| 2201 | 331 | 33007 | 8:38:05 | 33008 | 8:39:50 |

Route guide data storage DB

| Classification condition | Route guide data storing section |
|---|---|
| Rainy weekday | Route guide data A |
| Rainy Sat/Sun/Holiday | Route guide data B |
| Rainy weekday at the end of the month | Route guide data C |
| Weekday | Route guide data D |
| Sat/Sun/Holiday | Route guide data E |
| Weekday at the end of the month | Route guide data F |
|  |  |

F I G. 9

| Travel route No. | Name of bus stop | | | | | Weekday |
|---|---|---|---|---|---|---|
| 5 a.m. | | | | | | |
| 6 a.m. | 5 | 25 | 45 | | | |
| 7 a.m. | 0 | 15 | 30 | 45 | | |
| 8 a.m. | 0 | 10 | 20 | 30 | 40 | 50 |
| : | | | | | | |
| 12 p.m. | 5 | 35 | | | | |
| : | | | | | | |
| 6 p.m. | 0 | 10 | 20 | 30 | 40 | 50 |
| 7 p.m. | 0 | 15 | 30 | 45 | | |
| 8 p.m. | 5 | 25 | 45 | | | |
| 9 p.m. | | | | | | |
| | | | | | | |

ROUTE GUIDE DATA CREATION DEVICE, ROUTE GUIDE DATA CREATION METHOD, AND ROUTE GUIDE DISTRIBUTION DEVICE

BACKGROUND OF THE INVENTION

The present invention relates to a route guide data creation method and a route guide data creation device for creating route guide data for a vehicle that travels on a road according to a predetermined travel route and a predetermined travel time, such as a timetable for a route bus, and a route guide distribution device for providing a route guide using the route guide data created by the route guide data creation device. More particularly, it relates to a route guide data creation method and a route guide creation device for creating route guide data by acquiring actual travel data of a vehicle, and a route guide distribution device that distributes a route guide based on the route guide data created by the route guide data creation device.

When visiting a place, which is a destination, in an unfamiliar area, people have been using a map as an aid to reach the destination while confirming roads, landmarks, and addresses on the map. Alternatively, in a vehicle with a car navigation system (hereinafter referred to as a car-navigation), people start said car-navigation, input a destination, and can thereby reach their destination while acquiring guidance displayed on a monitor screen or audio output guidance (navigation information) outputted from the navigation system.

The operating principle behind the above-described car-navigation uses GPS. GPS signals transmitted from a plurality of GPS satellites that travel around the earth are received by a GPS antenna, and positions are specified by analyzing satellite positions, information on distances between the satellites and a receiver, and clock information included in said GPS signals. At least four or more GPS satellites are required for said plurality of GPS satellites. Although single position-fix accuracy is generally a little over 10 m, it can be improved to 5 m or lower by using DGPS (Differential GPS).

In recent years, the performance of mobile communication terminal devices, including mobile phones and PHS, has significantly improved, and multifunctionalization has been in progress. Especially, data communication functions other than call functions have been enhanced, and various kinds of data communication services via the Internet are provided to users. A navigation service is one of them, and experiments for providing a route guide from a current position to a destination not only to drivers of automobiles but also to mobile phone users have been started.

For example, the applicant has disclosed a navigation system using a mobile phone as a terminal in the following patent document 1 (Japanese published unexamined application No. 2003-214860). As shown in FIG. 8, this navigation system includes a mobile terminal (mobile phone) 1 that is to be connected to a traveling body communication network 2 and a data communication service center (information distribution computer system) 3. The mobile terminal 1 receives desired data communication services through connection with the data communication service center 3. If the mobile terminal 1 is a mobile phone or a PHS, a call to desired other end (land-line phone, mobile phone, PHS, etc.) can be made through traveling body communication base stations and telephone line networks via the traveling body communication network 2. The data communication service center 3 is configured as follows for providing route navigation services upon request from the mobile terminal 1.

More specifically, when a route search request including information on a departure point and a destination point is issued from the mobile terminal 1, the information distribution computer system in the data communication service center 3 searches an optimal route from the departure point to the destination point using road data stored in storing means, and temporarily stores searched route data in the storing means as guide route data. When display map information in which position coordinate and a guide route are specified is requested by the mobile terminal 1, the information distribution computer system in the data communication service center 3 reads vector-style map data for displaying a map around the specified position coordinate and the specified guide route data from the storing means. Then, the information distribution computer system converts the guide route data into vector data for displaying roads in a specified color, incorporates the vector data into the map data, and sends the map data to the mobile terminal 1, which is a requestor.

Although it is not shown in figures, the mobile terminal 1 has a GPS receiver for measuring a current position as it changes according to movement, and GPS positioning is performed at predetermined intervals. The mobile terminal 1 issues a request for display map information to the information distribution computer system in the data communication service center 3 when shortage occurs in result display map information of the GPS positioning. Moreover, the information distribution computer system in the data communication service center 3 has a storing means in which road data (map data) and data including landmarks, such as buildings in various places on maps, names of intersections, and names of roads are stored. Maintenance is preformed on the data by acquiring the latest data through information distribution computer systems 5, 6 that distribute maps via the Internet network 4.

Incidentally, in the above-described navigation system, when a route guide is provided for a vehicle that travels on a road based on a predetermined travel route and a travel time, such as a route bus, a timetable does not exist unlike trains or electric trains. As a result, route guide data (timetable data), which is the basis for a route guide, cannot be acquired. For example, the departure schedule (operation schedule) shown in FIG. 9 is posted at a bus stop of a route bus. The departure schedule that shows the departure time at each bus stop may be a timetable in the general meaning; however, it cannot be used as route guide data because data on links between the time at which a vehicle (bus) departs from a bus stop and the time at which the bus departs from the next bus stop does not exist.

Even if a thing such as a train timetable exists, a vehicle that travels on a road, such as a route bus, may not travel between bus stops as scheduled due to traffic conditions (traffic jams) or weather conditions (rain). Namely, the schedule posted at each bus stop is only a rough guide and a timetable created based on the posted schedule is very different from the actual travel time. Thus, the timetable cannot be used as route guide data.

To resolve such inconvenience, efforts are under way to improve users' convenience by collecting data that shows the operation conditions of an actually operating vehicle (information on at what time and from which bus stop a vehicle has departed, information on the current position of each vehicle, and so on) using means such as a radio device, displaying an estimated arrival time at the next bus stop, displaying at what section the operating vehicle is currently located on a route map at each bus stop, or distributing such information to a mobile phone or a CATV receiver.

For example, a bus approaching information display method and device are disclosed in the following patent document 2 (Japanese published unexamined application No.

11-185197). In the bus approaching information display method and device disclosed in patent document 2, bus position information is collected at a bus location center station via a radio transmitter equipped in a bus. The information is transmitted to a bus stop as well as to users' homes via a CATV station. An approaching bus is detected based on the information for each bus route and displayed at the bus stop. Said information is received by a data transceiver provided at each user's home and displayed on a display screen.

Furthermore, a bus stop system is disclosed in the following patent document 3 (Japanese published unexamined application No. 7-320198). Patent document 3 discloses a bus stop system that includes a bus timetable displaying system having a bus stop at which a bus ID, scheduled departure time of a bus stop, scheduled departure time from a previous bus stop are stored in an ID storing section in advance associated with the bus ID, the departed time of the bus from the previous bus stop and the bus ID are received by a receiving section, estimated departure time is calculated by a control section based on the departed time of the bus from the previous bus stop, and a scheduled departure time and a scheduled departure time from the previous bus stop corresponding to said bus ID, and displayed by a display section, and a control method of the bus timetable displaying system.

Various kinds of methods for collecting travel data from a vehicle have been devised or are in practice. For example, there is a method including installing a sensor under a road surface at a bus stop, reading an ID of a bus that has arrived at the bus stop, sending arrived time to a travel management center via radio communication; a method including sending announcements made by a driver to a travel management center via radio communication; and a method sending a current position of each bus by a GPS system installed in the bus.

Patent Document 1: Japanese published unexamined application No. 2003-214860 (FIG. 1)

Patent Document 2: Japanese published unexamined application No. 11-185197 (FIG. 1)

Patent Document 3: Japanese published unexamined application No. 7-320198 (FIG. 5)

SUMMARY OF THE INVENTION

Although the systems disclosed in the above patent documents 2 and 3 both collect radio position information or travel data (arrival time and departure time at/from each bus stop) from an actually operating vehicle and distribute a current vehicle position, approaching conditions to a bus stop, or an estimated arrival time to a bus stop to a display device at each bus stop or user's personal computer or mobile phone, such process only carries out data-processing once travel data has been collected from each vehicle. This process does not create timetable data, and thus cannot be used for a route guide.

The applicant of this application has conducted various investigations to resolve the above problems, and focused on a point that a service for providing vehicle positions and information on approach of the vehicle to a bus stop to users is implemented through collection of travel data, including position information and arrival and departure time to a bus stop, from each actually operating vehicle via radio communication. The applicant has found a solution to the above problems by collecting the operation information, creating route guide data similar to a timetable in a train system, and storing the data in a database, thereby arriving at the present invention.

Namely, the present invention is directed to solving the above problems, and it is an object of the present invention to provide a route guide data creation method and a route guide data creation device for creating route guide data based on predetermined travel data acquired from a vehicle that travels on a predetermined travel route according to a predetermined schedule, and to provide a route guide data distribution device that distributes a route guide based on route guide data created by the route guide data creation device.

To resolve the above problems, an embodiment of the invention of this application is a route guide data creation device that acquires travel data transmitted from a vehicle that travels on a road according to predetermined travel route and travel time, and creates route guide data based on the acquired predetermined travel data. Said route guide data creation device comprises travel data acquisition means that acquires said travel data over a predetermined period of time, travel data processing means that receives data formatted from said travel data into a predetermined input format, calculates arrival time and departure time for each travel route and each vehicle ID, and outputs the arrival time and departure time in a predetermined output format, and a route guide database that stores route guide data including the departure time and the arrival time of each stop and each vehicle outputted from said travel data processing means, said route guide data that is stored in said route guide database classified into a plurality of data groups based on conditions at the time when said travel data is acquired and stored.

In accordance with an aspect of the invention, the route guide data creation device acquires said travel data about the first vehicle through the last vehicle of each travel route.

According to an aspect of the route guide data creation device, the input format includes a vehicle ID, a route code, a next stop code, arrival time at a previous stop, and departure time from the previous stop.

According to an aspect of the route guide data creation device, the output format includes a vehicle ID, a route code, a departing stop code, arrival time, arriving stop code, and departure time.

According to an aspect of the route guide data creation device, the conditions at the time when the travel data is acquired include weather and/or day, and date.

According to an aspect of the route guide data creation device, the travel data processing means sorts the acquired travel data into order of departure time after sorting the acquired travel data into order of vehicle ID and order of route code, and calculates departure time and arrival time for each section between stops.

Another embodiment of the present invention is a route guide data creation method for acquiring travel data transmitted from a vehicle that travels on a road according to a predetermined travel route and travel time, and creating route guide data based on the acquired predetermined travel data, including, a step for acquiring travel data over a predetermined period of time, the travel data being transmitted from a vehicle that travels on a road, a step for inputting data formatted from the acquired travel data to a predetermined input format into operation processing means, a step for calculating arrival time and departure time at/from each stop for each vehicle ID from said inputted travel data, a step for outputting the arrival time and departure time at/from each stop, which are calculated for each vehicle ID, in a predetermined output format, and a step for classifying the route guide data, including the departure time and the arrival time of each vehicle from/at each stop, outputted from said travel data processing means based on the conditions at the time when the travel data is acquired, and storing in a route guide database.

According to an aspect of the route guide data creation method, the step for acquiring travel data includes a step for acquiring said travel data on a first vehicle through a last vehicle for each travel route.

According to an aspect of the route guide data creation method, the input format includes a vehicle ID, a route code, a next stop code, arrival time at a previous stop, and departure time from the previous stop.

According to an aspect of the route guide data creation method, the output format includes a vehicle ID, a route code, a departing stop code, departure time, arriving stop code, and arrival time.

According to an aspect of the route guide data creation method, the conditions at the time when the travel data is acquired include weather and/or day, and date.

According to an aspect of the route guide data creation method, the step for calculating arrival time and departure time at/from each stop for each vehicle ID from the inputted travel data includes a step for sorting the acquired travel data into order of departure time after sorting the acquired travel data into order of vehicle ID and order of route code, and calculating departure time and arrival time for each section between stops.

An embodiment of the present invention is a route guide distribution device, comprising a route guide database in which route guide data on a vehide that travels on a road according to a predetermined travel route and travel time is stored, and distribution means for distributing route guide in response to a route guide request from a mobile terminal based on the route guide data stored in said database, said route guide database storing route guide data including arrival time and departure time at/from each stop for each vehicle ID calculated for each travel route based on travel data acquired from a vehicle that travels on a road over a predetermined period of time, said route guide data classified into a plurality of data groups based on conditions at the time when said travel data is acquired.

According to an aspect of the route guide distribution device, the route guide database stores arrival time and departure time at/from each stop for each vehicle ID calculated for each travel route based on travel data acquired from each vehicle from a first vehicle to a last vehicle that travel on a road as route guide data.

According to an aspect of the route guide distribution device, said conditions at the time when travel data is acquired include weather and/or day, and date.

According to an aspect of the route guide distribution device, said distribution means distributes route guide created by acquiring route guide data corresponding to a condition at the time when route guide request is issued by a mobile terminal from said route guide database.

In accordance with embodiments of the present invention, the route guide data creation device acquires travel data transmitted from a vehicle that travels on a road according to a predetermined travel route and travel time over a predetermined period of time, the travel data processing means calculates arrival time and departure time at/from each stop for each travel route and each vehicle ID from the acquired travel data, and outputs in a predetermined output format, and route guide database stores route guide data including departure time and arrival time from/at each vehicle at each stop, said route guide data classified into a plurality of data groups based on conditions at the time when said travel data is acquired. Therefore, route guide data similar to a timetable in a train system can be created based on travel data of an actual vehicle. Moreover, the route guide data created in such a way is based on a result of actual operation, and has an advantage when the route guide data is used for route search in a route guide, that is, providing a search result based on a result of actual operation although the route guide data is different from the operation plan because of road conditions or weather for the period in which the travel data is acquired.

Furthermore, the route guide data creation device creates the route guide data by acquiring travel data on vehicles from the first vehicle through the last vehicle of each travel route. Thus, the route guide data can be created based on actual travel data on all operated vehicles in one day. As a result, route guide data on vehicles from the first vehicle to the last vehicle can be created.

Furthermore, the input format of the travel data inputted to the travel data processing means by the travel data acquisition means includes a vehicle ID, a route code, a next stop code, arrival time at a previous stop, and departure time from a previous stop. Therefore, departure time and arrival time can be calculated for each travel route and each vehicle ID at each stop.

Furthermore, the output format outputted by the travel data processing means includes a vehicle ID, a route code, a departing stop code, departure time, an arriving stop code, and arrival time. Therefore, route guide data including departure time and arrival time from/at each travel route and each vehicle ID for each section between stops can be created.

Furthermore, the condition at the time when said travel data is acquired includes weather and/or day, and date. Therefore, route guide data corresponding to a condition at the time when route guide is performed can be selected and used. For example, when route guide is performed on a weekday at the end of a month, data for a route guide similar to an actual condition can be provided by using route guide data created based on travel data acquired on a weekday at the end of a month.

Furthermore, the travel data processing means sorts the acquired travel data in order of departure time after sorting in order of vehicle ID and in order of route code, and calculates departure time and arrival time for each section between stops. Therefore, route guide data can be efficiently created without using manpower.

Furthermore, in accordance with embodiments of the present invention, the route guide data creation method performs steps of acquiring travel data transmitted from a vehicle that travels on a road according to a predetermined travel route and travel time over a predetermined period of time, calculating arrival time and departure time at/from each stop for each travel route and each vehicle ID by the travel data processing means based on the acquired travel data, outputting in a predetermined output format, and classifying route guide data including the departure time and the arrival time of each vehicle at each stop based on the conditions at the time when the travel data is acquired, and storing in a route guide database. Therefore, route guide data similar to a timetable in a train system can be created based on travel data of an actual vehicle. Moreover, the route guide data created in such a way is based on a result of actual operation, and has an advantage when the route guide data is used for route search in a route guide, that is, providing a search result based on a result of actual operation although the route guide data is different from the operation plan because of road conditions or weather for the period in which the travel data is acquired.

Furthermore, the route guide data creation method creates route guide data by acquiring travel data on vehicle from the first vehicle to the last vehicle in each travel route. Therefore, route guide data can be created based on actual travel data on all operated vehicles in one day. As a result, route guide data on vehicles from the first vehicle to the last vehicle can be created.

Furthermore, the input format of the travel data inputted into the travel data processing means by the travel data acquisition means includes a vehicle ID, a route code, a next stop code, arrival time at a previous stop, and departure time from the previous stop. Therefore, departure time and arrival time for each travel route and each vehicle ID at each stop can be calculated.

Furthermore, the output format outputted by the travel data processing means includes a vehicle ID, a route code, a departing stop code, departure time, an arriving stop code, and arrival time. Therefore, route guide data including departure time and arrival time from/at each travel route and each vehicle ID for each section between stops can be created.

Furthermore, the condition at the time when said travel data is acquired includes weather and/or day, and date. Therefore, route guide data corresponding to a condition at the time when a route guide is performed can be selected and used. For example, when a route guide is performed on a weekday at the end of a month, data for route guide similar to an actual condition can be provided by using route guide data created based on travel data acquired on a weekday at the end of a month.

Furthermore, the travel data processing means sorts the acquired travel data in order of departure time after sorting in order of vehicle ID and in order of route code, and calculates departure time and arrival time for each section between stops. Therefore, route guide data can be efficiently created without using manpower.

Furthermore, a route guide database is provided in which route guide data on a vehicle that travels on a road according to a predetermined travel route and travel time is stored, said route guide database storing route guide data including arrival time and departure time at/from each stop for each vehicle ID calculated for each travel route based on travel data acquired from a vehicle that travels on a road over a predetermined period of time as route guide data, said route guide data classified into a plurality of data groups based on conditions at the time when said travel data is acquired, and distributes a route guide in response to a route guide request from a mobile terminal based on the route guide data stored in said database. Therefore, route guide data similar to a timetable in a train system can be created based on travel data of an actual vehicle. As a result, the present invention has an advantage of providing a search result based on a result of actual operation.

Furthermore, the route guide database stores arrival time and departure time at/from each stop for each vehicle ID calculated for each travel route based on travel data acquired from each vehicle from a first vehicle to a last vehicle that travel on a road as route guide data. Thus, the route guide data can be created based on actual travel data on all operated vehicles in one day. As a result, route guide data on vehicles from the first vehicle to the last vehicle can be provided.

Furthermore, said conditions at the time when travel data is acquired include weather and/or day, and date. Therefore, route guide data corresponding to a condition at the time when route guide is performed can be selected and used. For example, when a route guide is performed on a weekday at the end of a month, data for a route guide similar to an actual condition can be provided by using route guide data created based on travel data acquired on a weekday at the end of a month.

Furthermore, the distribution means distributes a route guide created by acquiring route guide data corresponding to a condition at the time when a route guide request is issued by a mobile terminal from said route guide database. Therefore, route guide data corresponding to a condition at the time when a route guide is performed can be selected and used. As a result, route guide more similar to an actual condition can be provided.

BRIEF DESCRIPTION OF THE DRAWINGS

FIG. 3 is a diagram showing an example of travel data acquired from a vehicle.

FIG. 4(a) is a diagram showing a sorting result of travel data by the travel data processing section.

FIG. 4(b) is a diagram showing route guide data crated by converting the travel data according to an output format by the travel data processing section.

FIG. 6 is a schematic drawing showing a configuration of database that stores route guide data.

FIG. 9 is a diagram showing a conventional operation schedule posted at a bus stop of a route bus.

DETAILED DESCRIPTION OF THE INVENTION

Hereinafter, specific examples of the present invention will be described in detail referring to embodiments and drawings.

Figure 1:
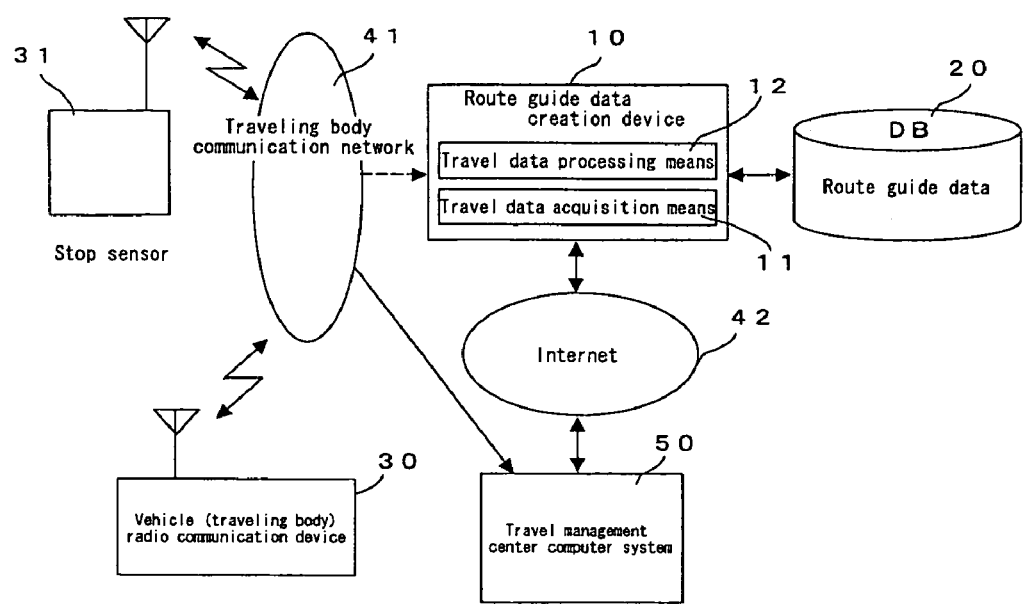
FIG. 1 is a schematic block diagram showing configurations of the route guide data creation device according to the present invention and peripheral devices of the route guide data creation device.

A route guide data creation device 10 according to an embodiment of the present invention, as shown in FIG. 1, includes travel data acquisition means 11 and travel data processing means 12. Travel data (information including the current position, and departure time and arrival time from/at each bus stop) of each vehicle is collected from a radio communication device 30 installed in a vehicle of a route bus and a sensor 31 installed at a bus stop to a computer system in a travel management center 50 via a traveling body communication network 41. The travel data acquisition means 11 acquires the travel data from the computer system in the travel management center 50 via an Internet network 42. The travel data acquired by the travel data acquisition means 11 is processed by the travel data processing means 12 as described later when travel data of each vehicle from the first vehicle to the last vehicle of each travel route, that is, a complete set of travel data for one day is acquired. Departure time and arrival time from/at each vehicle of each travel route at each bus stop are calculated, and route guide data (timetable data) is created and stored in a database 20. If a system such as the travel management center 50 does not intervene, the route guide data creation device 10 can be configured to directly acquire travel data from each vehicle via the traveling body communication network 41.

Figure 2:
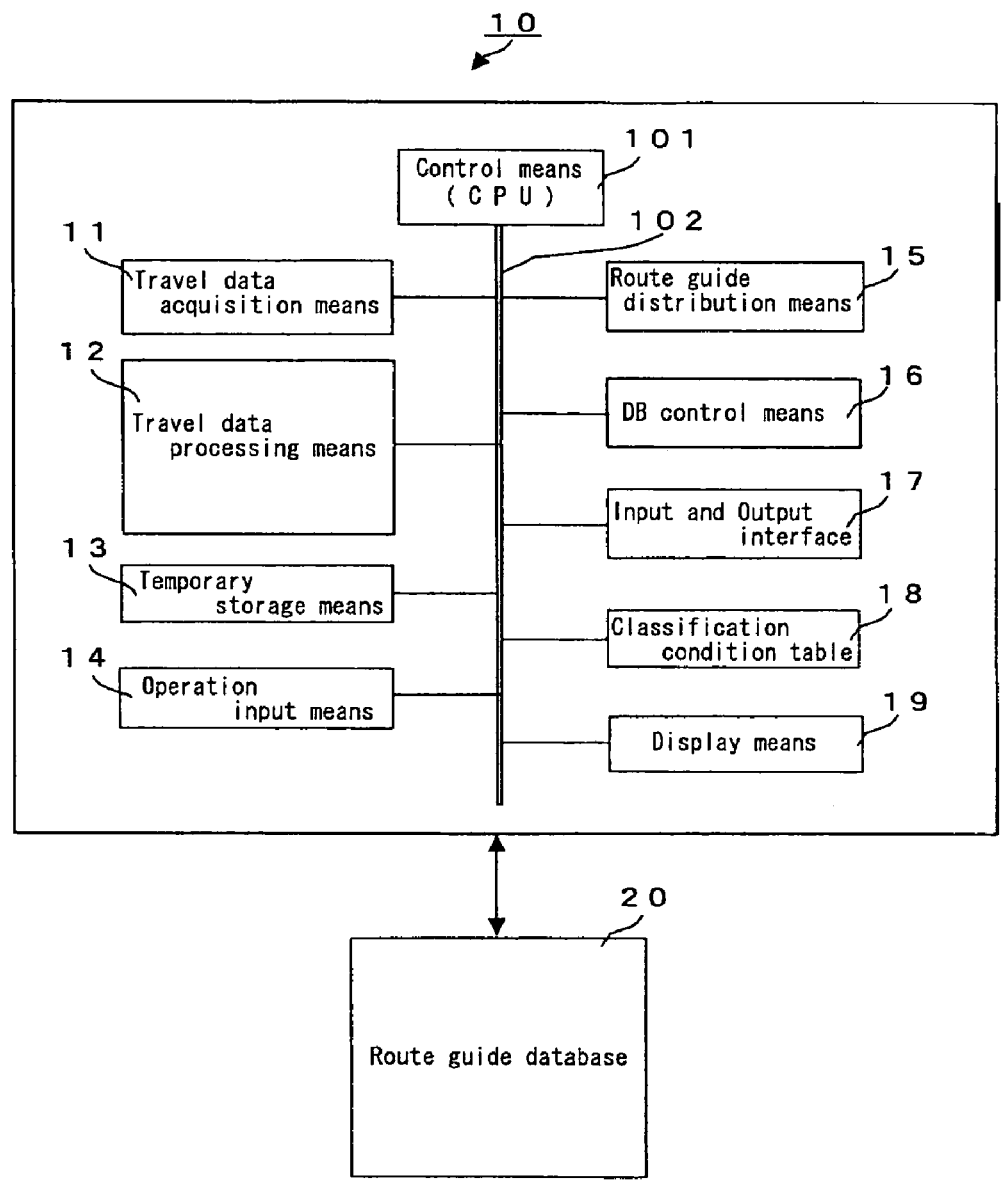
FIG. 2 is a block diagram showing a configuration of the route guide data creation device of FIG. 1.

FIG. 2 is a diagram showing a configuration of the route guide data creation device 10. The route guide data creation device 10 has control means 101, which is configured with a CPU, such as a microcomputer. The travel data acquisition means 11, the travel data processing means 12, a temporary storage means 13, operation input means 14, route guide distribution means 15, database (DB) control means 16, input and output interface 17, a classification condition table 18, and display means 19 are connected to the control means 101 via an internal bus 102. In the route guide data creation device 10, the route guide database 20 for storing route guide data is provided, in which the route guide data created by the travel data processing means 12 is stored. The route guide data is used for a service for searching a route and distributing a route guide upon a route guide request from a user.

The temporary storage means 13 is a memory used for temporarily storing data during processes performed by each section including the travel data processing means 12. The operation input means 14 is input means, such as a keyboard or a mouse, for operation of the route guide data creation device 10 performed by an operator. The display means 19 is a monitor, such as a liquid crystal display device or a CRT display. The input and output interface 17 is an interface provided for the route guide data creation device 10 to transmit data to or receive data from the outside world. The DB control means 16 performs control for storing data in the route guide database 20 or reading desired data out of the route guide database 20.

The classification condition table 18 is a table in which conditions including weather, day, and date at which the travel data is acquired are set, and for classifying and storing the route guide data in different database areas according to the conditions (said weather, day, and date) at the time when the travel information that is the source for creating said route guide data is acquired. Then, a condition when a route guide request is issued by a user is searched in the classification condition table, and route guide data created based on the travel information acquired under the condition corresponding to that condition is selected from the route guide database 20 and provided for a route guide.

Next, a procedure of creating route guide data by the travel data processing means 12 will be explained referring to FIGS. 3 through 4. The travel data acquisition means 11 acquires travel data, which is transmitted from each vehicle of each travel route to the travel management center 50, in time sequence, and inputs the travel data into the travel data processing means 12. An input data format at that time includes a vehicle ID, a route code, a next bus stop code, arrival time and departure time at/from a previous bus stop, and the number of bus stops from the first bus stop is added to the next bus stop code. The input data is inputted into the travel data processing means 12 in time sequence, and stored in the temporary storage means 13 as shown in FIG. 3.

The vehicle ID is an ID of a radio terminal installed in a vehicle, and the route code is a code of a bus route. Different route codes are assigned to an inbound route and an outbound route, respectively. The number of bus stops from the first bus stop is the number of bus stops from the first stop in the route, and the number "1" is assigned to the first bus stop. The next bus stop code is a bus stop code of the bus stop at which the route bus (vehicle) stops next. In a route on which an express bus travels, the next bus stop code at which the express bus stops next is an bus stop code at which the express bus actually stops next. At the last bus stop, the next bus stop code does not exist. Therefore, a special code, such as "99999," is assigned to indicate that it is the last bus stop. The arrival time at the previous bus stop indicates the time at which the vehicle arrived at the previous bus stop, which includes the time at which the vehicle passed through the previous bus stop in cases where the vehicle did not stop at that stop. The departure time from the previous bus stop indicates the time at which the vehicle departed from the previous bus stop, which includes the time at which the vehicle passed through the previous bus stop in cases where the vehicle did not stop at that stop. If the vehicle passes through the previous bus stop without stopping, the arrival time and departure time at/from the previous bus stop may be the same.

When a complete set of travel data on all vehicles of all travel route from the first vehicle to the last vehicle, that is all vehicle data for one day is acquired, the travel data processing means performs a processes according to the following procedure.

(1) Separate data in order of vehicle ID, and in order of route code.

(2) Sort the separated data, which is separated in order of vehicle ID, by departure time, and recombine. There are vehicles operated crossing midnight, 24:00. In such a case, the time is indicated, for example, 24:30. Thus, no problem occurs in the sort process.

(3) Sequentially extract the vehicle ID, the route code, the departing bus stop code, the departure time, the arriving bus stop code, and the arrival time of each section between bus stops from the data.

This is a format of output data of the travel data processing means, and the output data acquired from the results is timetable data (route guide data), which can be used for route search. The data separation performed in step (1) is included in a concept of data sorting, and it means making data for each vehicle ID and data for each route code into data clusters, respectively. Sorting data for each vehicle ID and data for each route code is equal to separating data for each vehicle ID and data for each route code. The sorting by departure time performed in step (2) is performed for the clusters of the data separated in step (1).

FIG. 4 is a diagram for explaining the above procedure. FIG. 4(a) is a diagram showing a result of sorting of travel data, and FIG. 4(b) is a diagram showing route guide data created by converting the travel data according to the output format. A process for converting the result of sorting shown in FIG. 4(a) into the output data shown in FIG. 4(b) is as follows. Namely, the first data is always data on the first bus stop including a vehicle ID 1001 and a route code 301 as shown in the top line of FIG. 4(a).

A procedure for creating the output data in the first line of the output data of FIG. 4(b) will be explained focusing on the vehicle ID 1001 and the route code 301. The data in this line is data on the first bus stop. Although the first bus stop does not have a departing bus stop code, it can be determined by subtracting the number of bus stops of the first bus stop from the next bus stop code. In this case, the bus stop code of the next bus stop is 30102 (see the data in the top line of FIG. 4(a)). Thus, 30101, which is calculated by subtracting the number of bus stops form the first bus stop, which is 1, from the next bus stop code 30102, is applicable.

The departure time is the departure time of the bus, which is 8:30:25. The next bus stop code 30102 is applied for the arriving bus stop code. If the "next bus stop code" in the next line in FIG. 4(a) is referred to and is different from the "next bus stop code" in the above line, the arrival time in that line, which is 8:37:00, is applied for the arrival time. Data on one section between stops of the vehicle ID 1001 of the route code 301 is created by this process. If the "next bus stop code" in the next line is not different, it means that the vehicle is an express, and the "next bus stop code" in the next line is sequentially referred. The "next bus stop code" always varies at a bus stop at which the vehicle should stop. Thus, the output data is created by using the data on the arrival time in that line (see an arrow A in FIG. 4).

The timetable data (route guide data) can be created by repeating this process for each bus stop. If the "next bus stop code" is "99999", it is the last bus stop, and therefore, the output data TIGL of the vehicle ID 1001 of the route code 301 is completed. Creation of route guide data based on actual vehicle operation is completed by repeating this process for all vehicles of all routes. The route guide data created in such a way is stored in the route guide database 20 via the input and output interface 17 under the control of the data base control means 16.

Figure 5:
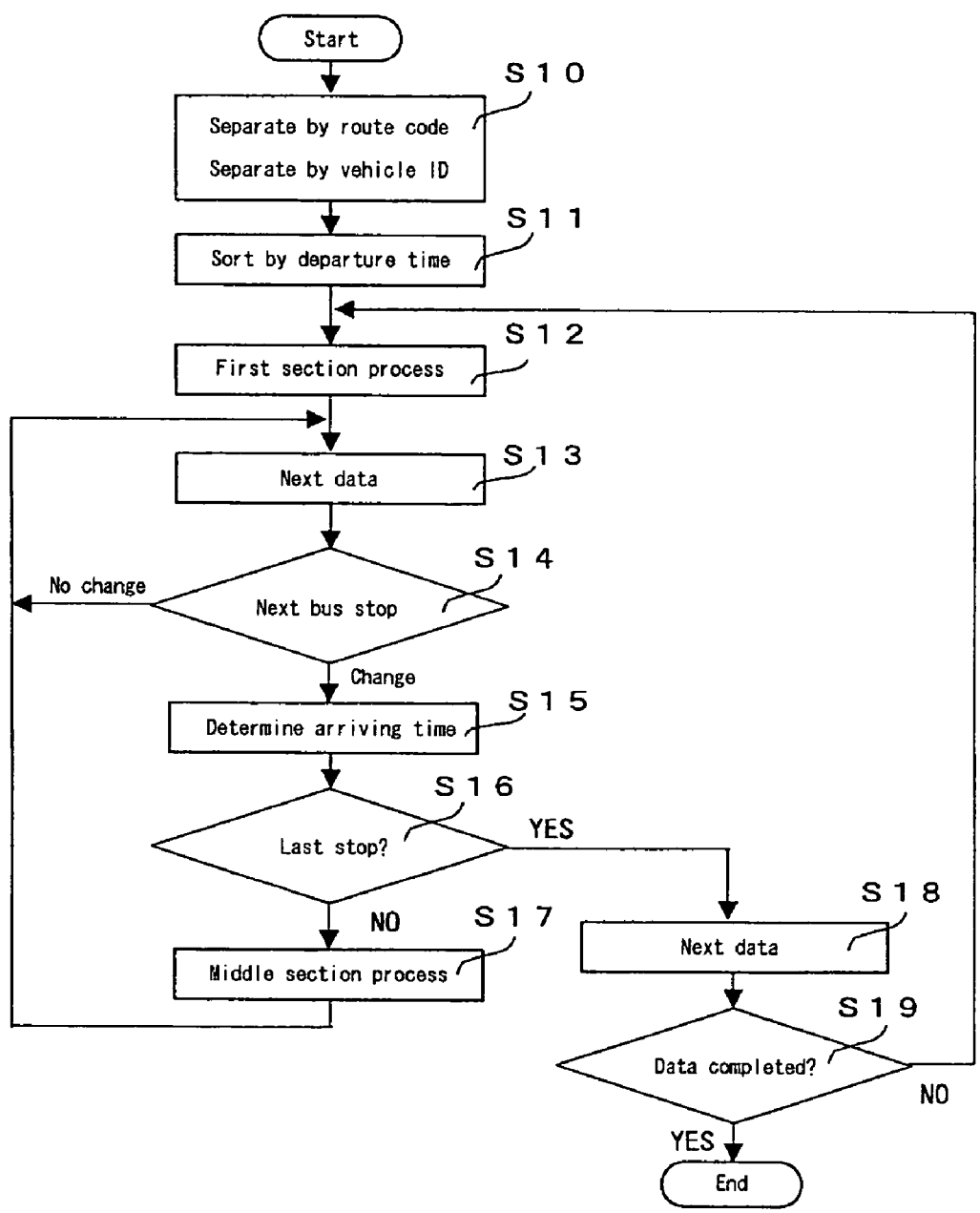
FIG. 5 is a flowchart showing a procedure of the travel data processing section.

FIG. 5 is a flowchart showing the above procedure. When the travel data for one day is acquired by the travel data acquisition means 11, the data is first separated in order of the route code, and in order of the vehicle ID (vehicle code) in step S10. Next, it is sorted in order of departure time in step S11. Then, a process for the first section is performed in step S12. In this process, as described earlier, the departing bus stop code of the first bus stop is set, and the departing time (departure time) of the bus stop and the arriving time (arrival time) of the arriving bus stop code, which is the next bus stop code, are determined.

Then, next data is referred in step S13, and if the "next bus stop code" of the next data is varied in step 14, step S15 is performed. If it is not varied, step S13 is repeated, and still nest data is referred. If the "next bus stop code" is varied, the arrival time of the data is determined as the arriving time of the arriving bus stop in step S15. In step S16, it is determined whether the "next bus stop code" indicates the last bus stop. If YES (last bus stop), step S18 is performed. If NO (not the last bus stop), step S17 is performed. In step 17, a middle section process is performed, and step S13 and later steps are repeated.

If the "next bus top code" in step S16 is the last bus stop (code "99999"), a process for the next data, that is, the next route, or the next vehicle ID (different vehicle of the same route code) is performed in step S18. If data is completed in step S19 (travel data for one day), the travel data processing is completed. If data is not completed, the process for the next route or the next vehicle ID (different vehicle of the same route code) is repeated in step S12 through step S19. The route guide data (timetable) can be efficiently created without using manpower by repeating the above process.

The route guide data created from the travel data of a vehicle acquired in this way is stored in the route guide database 20, and used for route guide in the route guide device. It is well known that operation of a vehicle that travels on a road, such as a route bus, is greatly affected by the road conditions on that day. It differs due to weather and day of the week, and moreover, it is well known that traffic volume increases on a specific day, such as a weekday at the end of the month, and causes traffic jams. Therefore, a timetable is very likely to be different according to conditions (weather, day, specific day) at the time when travel data is acquired even if the route guide data (timetable) is created based on travel data on an actual vehicle. Thus, it is preferable to provide route guide data created under consideration of conditions at the time when a user requests a route guide for the data used for a route guide corresponding to a route guide request from the user.

Therefore, the route guide data creation device of the present invention is configured to separately store route guide data created from said travel data in the route guide database 20 for each condition by sectioning the route guide database 20 according to conditions at the time when travel data of a vehicle is acquired, for instance, rainy day, weekday, Saturday, Sunday, holiday, or weekday at the end of the month. FIG. 6 shows a configuration of the route guide database 20.

As shown in FIG. 6, the route guide database 20 is configured such that the route guide data storing section is sectioned for each sectional condition, and to store route guide data created from travel data in a corresponding route guide data storing section according to a sectional condition determined by a condition at which the travel data is acquired.

For example, route guide data A created based on travel data acquired on a rainy weekday is stored in a route guide data storing section corresponding to a sectional condition of rainy weather and weekday. Route guide data B or route guide data F created based on travel data acquired on rainy Saturday, Sunday, or holiday, rainy weekday at the end of the month, weekday, Saturday, Sunday, or holiday, or weekday at the end of the month are as in the same manner. The sectional conditions are stored in a sectional condition table 18 of the route guide data creation device 10, referred by the database (DB) control means 16 when the created route guide data is stored in the route guide database 20, and the route guide data is stored in a specific area. The sectional condition table 18 is also provided in the route guide distribution device 60 shown in FIG. 7, and a route guide with route guide data that is more similar to an actual condition can be provided by referring to the created route guide data under a condition applicable to a condition at that time when a route guide request is issued by a user.

Figure 7:
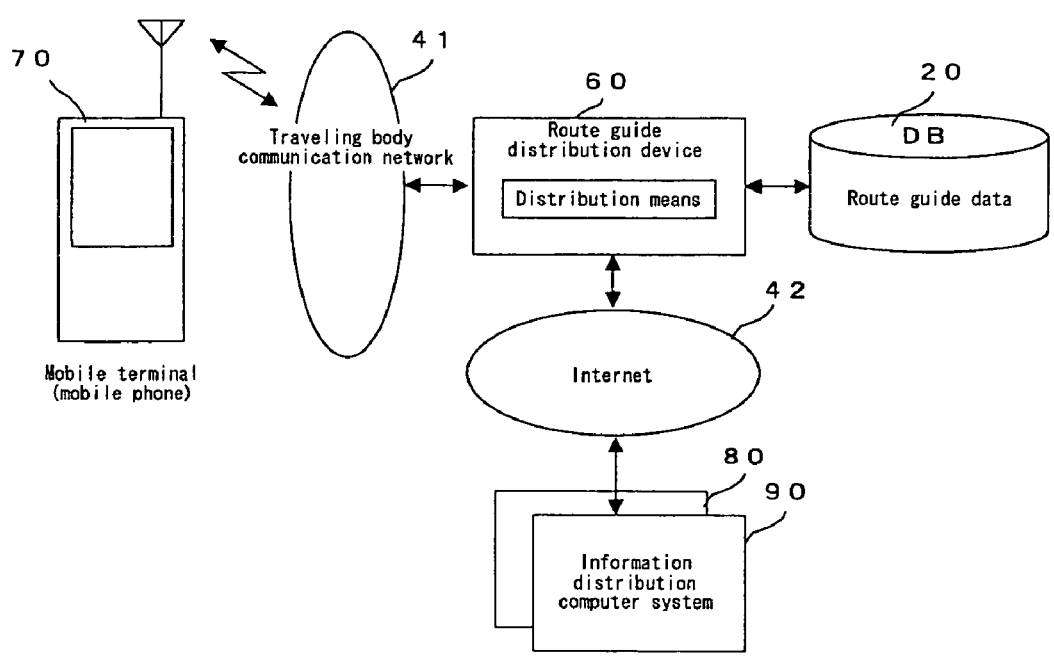
FIG. 7 is a schematic block diagram showing configurations of the route guide distribution device and peripheral devices of the route guide distribution device.
Figure 8:
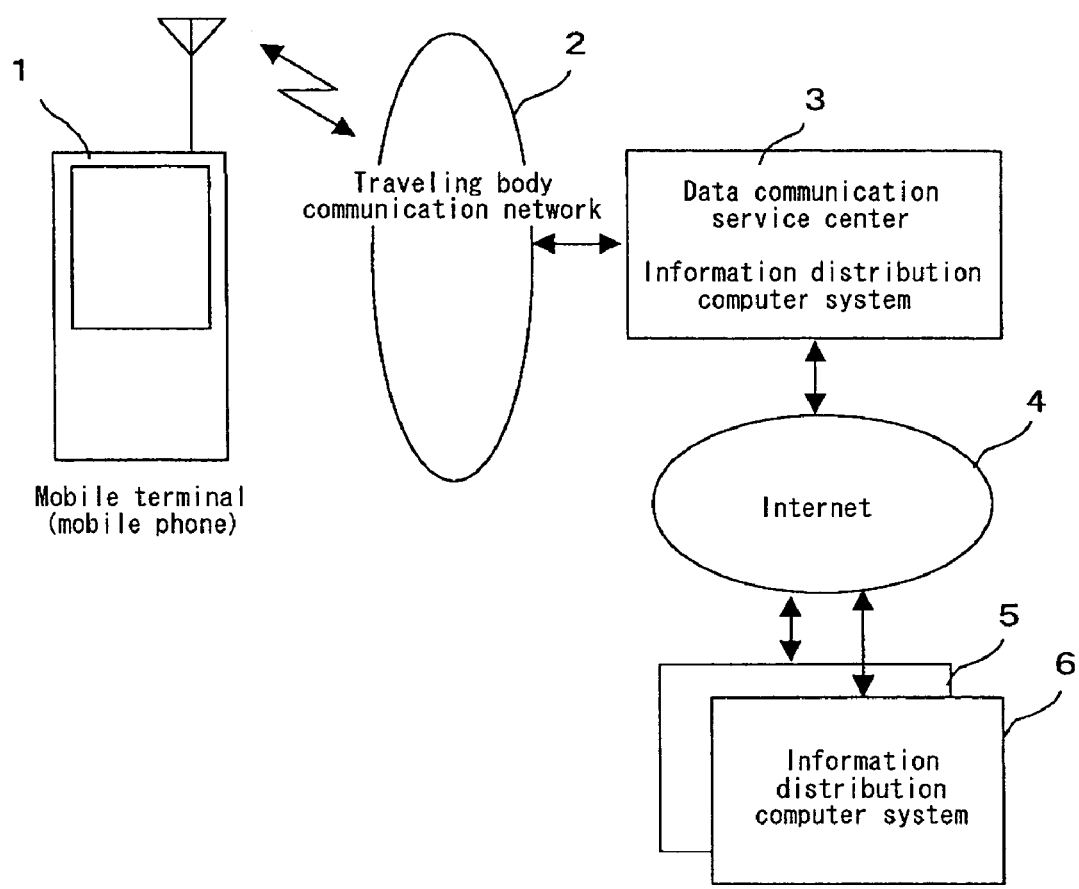
FIG. 8 is a block diagram showing a configuration of a conventional navigation system using a mobile telephone as a terminal.

FIG. 7 is a diagram showing a system configuration of the route guide distribution device 60 for performing a route guide for a user using route guide data created by the route guide data creation device 10 of the present invention and peripheral devices of the route guide distribution device 60. In FIG. 7, the route guide distribution device 60 basically includes functions similar to a conventional information and communication computer system of an information and communication service center shown in FIG. 8, and includes the route guide database 20 that stores route guide data created by the route guide data creation device 10 of the present invention. Moreover, it includes distribution means for distributing a result of route search performed by referring to the route guide data stored in the route guide database 20 corresponding to a route guide request transmitted from a mobile terminal 70 via a traveling body communication network 41 to said mobile terminal 70 as a route guide. Information distribution computer systems 80, 90 are computer systems for providing various kinds of data services necessary for map information, traffic and other information, route search, and route guides. The route guide distribution device 60 acquires necessary information from these computer systems via an Internet network 42. Furthermore, the route guide distribution device 60 can be integrated into the route guide data creation device 10 (see FIG. 1), and the route guide database 20 can be integrated.

As described above, a route guide data creation device for creating route guide data (timetable) on a vehicle that travels on a road according to a predetermined travel route and travel time, such as a route bus, can be provided by the present invention. Furthermore, a route guide distribution device for performing route search and route guides using the created route guide data can be provided by the present invention.

The invention claimed is:

1. A route guide data creation device that acquires travel data transmitted from a plurality of vehicles that travel according to a predetermined travel route and travel time, the travel route including a plurality of stops, and creates route guide data based on the acquired travel data, comprising:

a travel data acquisition component configured to respectively acquire said travel data from each of the plurality of vehicles traveling according to said predetermined travel route over a predetermined period of time and to format said travel data into a predetermined input format, the predetermined input format including a vehicle ID, a route code, a next stop code, an arrival time at a previous stop, and a departure time from the previous stop;

travel data processing means for receiving from said travel data acquisition component said travel data formatted into the predetermined input format, calculating an arrival time and departure time at/from each stop on said predetermined travel route for each vehicle, and outputting the arrival time and departure time of each vehicle at each stop in a predetermined output format, said predetermined output format including a vehicle ID, a route code, a departing stop code, an arrival time, an arriving stop code, and a departure time; and a route guide database that stores route guide data including the departure time and the arrival time of each vehicle at each stop outputted from said travel data processing means, said route guide data that is stored in said route guide database classified into a plurality of data groups based on conditions at the time when said travel data is acquired and stored.

2. A route guide data creation device according to claim 1, wherein the route guide data creation device acquires said travel data about a first vehicle through a last vehicle of said predetermined travel route.

3. A route guide data creation device according to claim 1 or 2, wherein the conditions at the time when said travel data is acquired include weather and/or day, and date.

4. A route guide data creation device according to claim 1 or 2, wherein said travel data processing means sorts the acquired travel data into order of a departure time after sorting the acquired travel data into an order of a vehicle ID and order of a route code, and calculates departing time and arriving time for each section between stops.

5. A route guide data creation method for acquiring travel data transmitted from a plurality of vehicles that travel according to a predetermined travel route and travel time, the travel route including a plurality of stops, and creating route guide data based on the acquired travel data, comprising:

acquiring travel data transmitted from each of said plurality of vehicles traveling according to said predetermined travel route over a predetermined period of time;

formatting the acquired travel data to a predetermined input format, said predetermined input format including a vehicle ID, a route code, a next stop code, an arrival time at a previous stop, and a departure time from the previous stop;

calculating an arrival time and a departure time at/from each stop on said predetermined travel route for each vehicle from said travel data formatted to said predetermined input format;

outputting the arrival time and departure time at/from each stop, which are calculated for each vehicle, in a predetermined output format, said predetermined output format includes a vehicle ID, a route code, a departing stop code, a departure time, an arriving stop code, and an arrival time; and classifying the route guide data, including the departure time and the arrival time of each vehicle from/at each stop, based on the conditions at the time when the travel data is acquired, and storing in a route guide database.

6. A route guide data creation method according to claim 5, wherein the step for acquiring said travel data includes a step for acquiring said travel data on a first vehicle through a last vehicle for said predetermined travel route.

7. A route guide data creation method according to claim 5 or 6, wherein the conditions at the time when the travel data is acquired include weather and/or day, and date.

8. A route guide data creation method according to claim 5 or 6, wherein the calculating arrival time and departure time at/from each stop for each vehicle from said inputted travel data includes sorting the acquired travel data into order of departure time after sorting the acquired travel data into order of a vehicle ID and order of a route code, and calculating departing time and arriving time for each section between stops.

9. A route guide distribution device, comprising:

a travel data processing means for receiving data formatted into an input format including a vehicle ID, a route code, a next stop code, an arrival time at a previous stop and a departure time from the previous stop, calculating an arrival time and a departure time at/from each stop for each vehicle ID for a predetermined travel route, and outputting route guide data formatted into an output format including a vehicle ID, a route code, a departing stop code, an arrival time, an arriving stop code and a departure time;

a route guide database storing the output formatted route guide data on a plurality of vehicles that travel on a road according to a predetermined travel route and travel time; and a distribution component configured to distribute a route guide in response to a route guide request from a mobile terminal based on the output formatted route guide data stored in said route guide database, said route guide database storing route guide data including the arrival time and the departure time at/from each stop for each vehicle ID calculated for the predetermined travel route with said travel data processing means on the basis of travel data acquired from each vehicle that travels on the road over a predetermined period of time, said route guide data classified into a plurality of data groups based on conditions at the time when said travel data is acquired.

10. A route guide distribution device according to claim 9, wherein said route guide database stores arrival time and departure time at/from each stop for each vehicle calculated for said predetermined travel route based on travel data acquired from each vehicle from a first vehicle to a last vehicle that travel on a road as route guide data.

11. A route guide distribution device according to claim 10, wherein the conditions at the time when said travel data is acquired include weather and/or day, and date.

12. A route guide distribution device according to claim 11, wherein said distribution component distributes route guide created by acquiring route guide data corresponding to a condition at the time when route guide request is issued by a mobile terminal from said route guide database.

13. A route guide distribution method, comprising:

receiving travel data related to a plurality of vehicles that travel on a road according to a predetermined travel route and travel time, the travel data being formatted into an input format including a vehicle ID, a route code, a next stop code, an arrival time at a previous stop and a departure time from the previous stop;

calculating an arrival time and a departure time at/from each stop for each vehicle ID for each predetermined travel route;

outputting route guide data formatted into an output format including a vehicle ID, a route code, a departing stop code, an arrival time, an arriving stop code and a departure time;

storing the output formatted route guide data related to the plurality of vehicles that travel on a road according to a predetermined travel route and travel time in a route guide database; and distributing a route guide in response to a route guide request from a mobile terminal based on the output formatted route guide data stored in said route guide database; and classifying said route guide data into a plurality of data groups based on conditions at the time when said travel data is acquired.

* * * * *